Feb. 1, 1966     B. REYNOLDS     3,232,728
SYNTHESIS GAS GENERATION
Filed Dec. 13, 1961
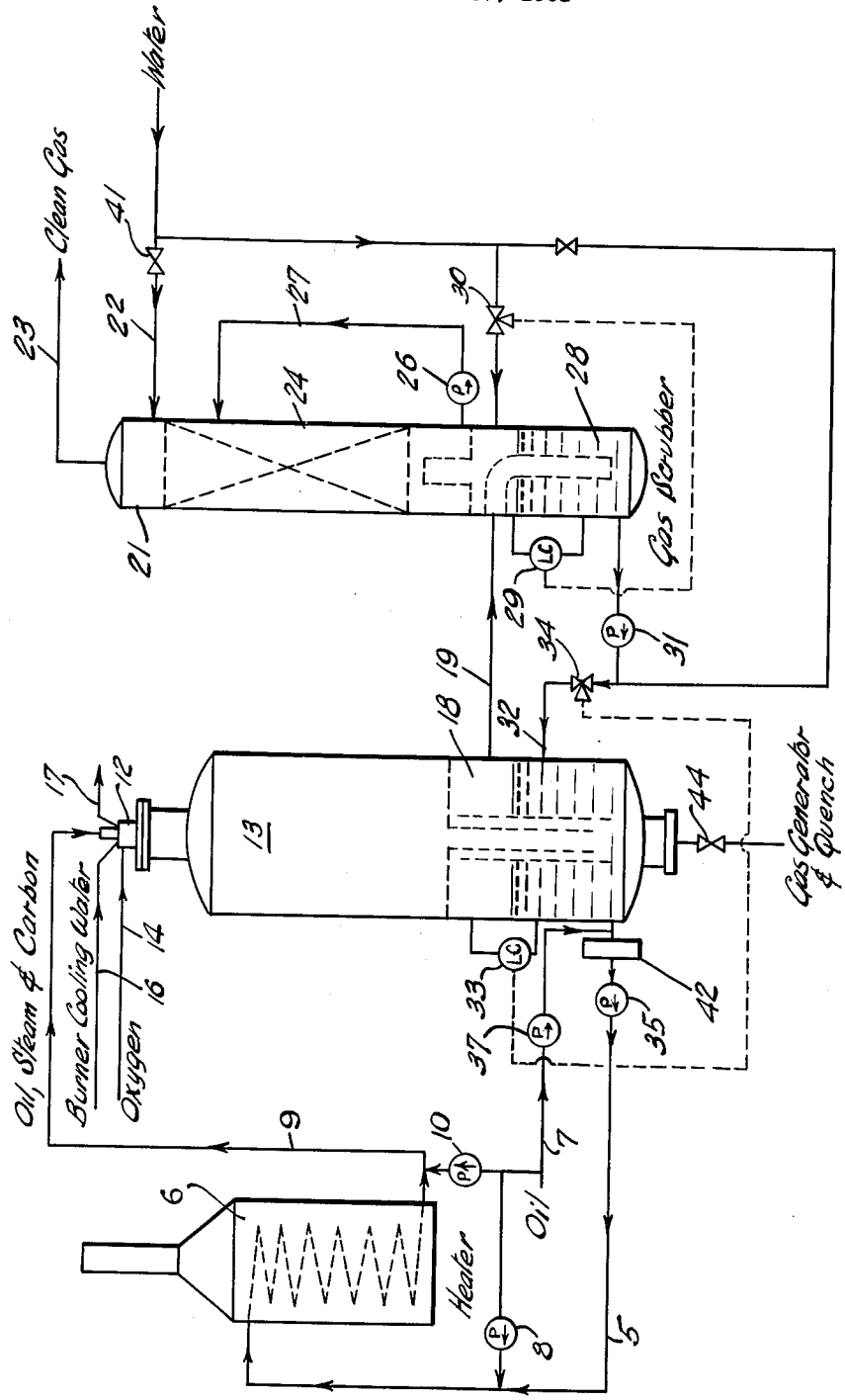

United States Patent Office 3,232,728
Patented Feb. 1, 1966

3,232,728
SYNTHESIS GAS GENERATION
Blake Reynolds, Riverside, Conn., assignor to Texaco Development Corporation, New York, N.Y., a corporation of Delaware
Filed Dec. 13, 1961, Ser. No. 159,102
3 Claims. (Cl. 48—215)

This invention relates to a process for the production of carbon monoxide and hydrogen, or synthesis gas, from liquid hydrocarbons by reaction with oxygen and steam. In one of its more specific aspects, it relates to a method of generating synthesis gas non-catalytically under carbon-forming conditions, separating particles of free carbon entrained in the gaseous products of reaction by scrubbing the gas with water to form a slurry of carbon in water and recycling carbon and at least part of the wash water, as steam, to the gas generation zone.

In accordance with the present invention, hydrocarbon oil is added to the slurry of carbon in water obtained in the quench cooling and scrubbing of the hot product gases from the synthesis gas generator to form a mixture of carbon, oil and water and the mixture is passed to a tubular heater wherein water is vaporized to form a dispersion of carbon and oil in steam. This dispersion is supplied to the reaction zone together with oxygen for the production of synthesis gas. The oil is substantially unvaporized, or only partly vaporized, depending upon the particular hydrocarbon or mixture of hydrocarbons employed, as will be evident from the detailed description hereinafter. Preferably the hydrocarbon liquid has an initial boiling point above about the boiling point of water, suitably above 250° F.

The generation of carbon monoxide and hydrogen, or synthesis gas, by partial oxidation of hydrocarbon oils forms a highly economical method of producing these gases in quantity. In the partial oxidation process, a liquid hydrocarbon is reacted with the oxygen and steam in a closed, compact reaction zone in the absence of catalyst or packing at an autogenously maintained temperature within the range of about 1800 to 3500° F., preferably about 2200 to 2800° F. Preheating of the reactants is generally desirable; preferably the hydrocarbon oil and steam are preheated to a temperature of at least 600° F. Oxygen may be, but need not be, preheated. The reaction zone is generally maintained at a pressure above 100 pounds per square inch gauge and may be maintained at a pressure as high as about 2,000 pounds per square inch gauge. Steam is introduced into the reaction zone to assist in the dispersion of the fuel fed to the reactor, to assist in control of the reaction temperature, and as a reactant to increase the relative amount of hydrogen produced. The product gas stream consists principally of carbon monoxide and hydrogen and contains relatively small amounts of water vapor, carbon dioxide and entrained carbon. The solid carbon produced in the process is in very fine particle form and is easily wet by water.

The amount of uncombined oxygen supplied to the reaction zone is limited so that nearly maximum yields of carbon monoxide and hydrogen are obtained. Air, oxygen-enriched air, or substantially pure oxygen may be employed in the process. Oxygen of high purity may be readily obtained by liquefaction and rectification of air. Commercial oxygen plants capable of delivering large amounts of high purity oxygen produce oxygen streams containing in excess of 95 mol percent oxygen; oxygen of this purity is generally preferred in the process.

Product gases issuing from the gas generation reactor contain a large amount of heat. This may be employed to convert water to steam. If, for example, the synthesis gas from the gas generation step is to be passed to a process requiring additional steam as a reactant, for example, a water gas shift process, steam may be generated directly by contacting the effluent hot gas from the synthesis gas generator with water. In this case, part of the water is vaporized to produce additional steam, generally in an amount within the range of 0.5 to 1.0 mol per mol of synthesis gas. Where it is not desirable to add further amounts of water vapor to the synthesis gas stream, the heat may be recovered from the gas generator effluent by passing the hot gases through heat exchangers or waste heat boilers. Steam produced in waste heat boilers may be used advantageously as process steam or in the generation of power for plant use, for example, for the production of oxygen. Heat exchangers may be used for preheating feed streams to the synthesis gas generator. When the product gases are cooled by indirect heat exchangers, it is preferable to cool the gases to a temperature above the dew point of the gas at the prevailing pressure to avoid condensation of water with resultant corrosion of heat exchanger surfaces and adhesion of carbon thereto.

Entrained carbon in the gas stream is effectively removed from the product gases by contacting with water in gas-liquid contact apparatus, for example, spray towers, bubble plate contactors, or packed columns. Cooling of the synthesis gas may be effected also in the gas scrubbing operation by vaporizing part of the water employed in scrubbing the gas stream, by cooling the scrubbing water, or by a combination of vaporization and cooling.

It is desirable to maintain the solids content of the water in the scrubbing zone and in the quench zone not above about one percent carbon by weight to prevent caking of carbon on the apparatus and maintain a fluid slurry or suspension which can be satisfactorily passed through pipes for utilization and disposal of the carbon. It has been proposed heretofore that carbon-containing water from the gas-liquid contacting zones be recycled to the synthesis gas generator as a source of steam for the process. The amount of steam which can be supplied to the gas generator for optimum operation generally is within the range of 0.5 to 0.9 pound per pound of fuel oil supplied thereto. Since it is necessary to limit the carbon content of the water to not more than about one percent by weight for reasons explained above, the restrictions on amount of water and carbon concentration limits the amount of carbon which can be returned to the generator as a carbon-water slurry to a small amount. This amount is less than the amount of carbon normally produced from heavy fuel oils.

It has now been discovered that more carbon may be carried in the water without danger of excessive thickening or gelling if oil is added to the carbon-water mixture. The problem of maintaining a carbon-water slurry in pumpable form with relatively high carbon concentrations is solved by the method of this invention by addition of hydrocarbon oil feed for the process directly into the carbon-water slurry obtained in the gas-liquid contactor. Carbon concentrations of four weight percent are readily handled by this method.

Generally it is desirable to operate the synthesis gas generator so that about two percent of the carbon content in the hydrocarbon supplied to the gas generator is liberated as free carbon entrained in the product gas. It is also desirable to supply about 0.5 to 0.9 pound of steam per pound of oil to the synthesis gas generator. The present invention makes it possible to maintain the quantity of unconverted carbon within the desired range and still recycle all of the carbon with the water to the synthesis gas generator.

Effective washing of the gas stream from the synthesis gas generator usually requires higher liquid rates than the amount required to suspend the separated carbon; therefore, it is generally desirable to recycle a portion of the scrubbing water to the gas scrubber to provide a sufficient volume of liquid therein. The recycled stream of wash water is preferably drawn off at a point where the carbon concentration is well below the maximum concentration in the gas-liquid contacting system and reintroduced at a point below the point of introduction of fresh water. The temperature of the slurry of carbon in water withdrawn from the gas-liquid contacting system is advantageously maintained as high as practical to provide preheat for the succeeding vaporization steps. The scrubbing temperature will not exceed the equilibrium vaporization temperature of water at the existing operating pressure. The equilibrium vaporization temperature will be somewhat below the boiling point of water at the existing pressure due to the fact that presence of hydrogen and carbon monoxide reduces the partial pressure of the water vapor so that vaporization of water takes place at a correspondingly lower temperature. A substantial temperature differential may be maintained in the gas scrubbing zone, if desired, by introducing cooled scrubbing water at the top of the scrubber so that the clean scrubbed gas is discharged at a relatively low temperature and with a relatively low water vapor content.

It is desirable to operate the scrubber at a high pressure, or substantially the pressure of the synthesis gas generator with allowance for pressure drop through the lines and other equipment. The use of high pressure makes possible relatively high temperatures in the scrubbing zone, minimizes the heat required to convert the dispersion of carbon in water to a dispersion of carbon and oil in steam, and delivers the product gas for subsequent use at high pressures with a minimum amount of compression.

In accordance with the process of this invention, the slurry of carbon in the scrubbing and quench water from the synthesis gas generator is mixed with fuel oil feed for the synthesis gas generator. Heavy fuel oils suitable for use in the process include, for example, heavy distillates, residual fuel oil, bunker fuel oil and No. 6 fuel oil. Oils having an API gravity less than 10° API are preferred. Advantageously the fuel oil is preheated prior to mixing the oil with the slurry of carbon in water. The amount of oil added to the slurry to reduce its viscosity and ensure pumpability ranges from about one half to about two times the oil absorption value of the carbon contained in the slurry. Generally, carbon produced in the synthesis gas generator has an oil adsorption value in the range of 2 to 4 milliliters of oil per gram of dry carbon, or about 24 to 48 gallons per hundred pounds.

Additional amounts of oil, up to the full amount required as feed for the synthesis gas generator (one to two pounds per pound of the slurry) are preferably added after metering of the water and prior to introduction to the heater in which the water is vaporized prior to its introduction to the generator. Alternatively, at least part of the feed oil remaining after injection of the oil into the slurry to maintain fluidity can be injected into the stream of steam issuing from the feed water vaporizer.

Oil absorption value is a measure of the amount of oil necessary to wet a particular sample of carbon. The oil absorption value is determined by adding small increments of oil to a sample of carbon, and mixing with a spatula between each addition until a single coherent ball of paste is formed which does not break down after forming. The procedure for this test is described in detail in ASTM Test D281-31. The standard test specifies alkali-refined linseed oil but the test is of value when used with other oils as well. The numerical oil absorption value represents the number of milliliters of oil added per gram of carbon. Oil absorption value may be expressed as milliliters per gram or may be converted to units of gallons per hundred pounds by applying a factor of 12.

Mixing of the hydrocarbon oil with the slurry of carbon in water may be effected with a mixing valve, pump orifice, nozzle, propeller mixer, turbine mixer or the equivalent. It is preferred to contact the carbon in water slurry with the oil at the temperature and pressure of the gas-liquid contact zone. After mixing, the fluid mixture is passed to a tubular heater at a velocity above about 0.5 foot per second sufficient to provide a vapor velocity above about 20 feet per second when the water is vaporized to steam. The pressure in the tubular heater is sufficiently higher than the pressure of the synthesis gas generator to permit discharge of the dispersion of oil and carbon in steam directly into the generator without compression.

When heavy fuel oils containing ash are used for the production of carbon monoxide and hydrogen, the ash from the fuel oil is liberated by the partial combustion reaction along with the liberated carbon and is combined with or absorbed on the particles of liberated carbon. When the carbon-containing ash, which usually comprises naturally-occurring heavy metal components, such as vanadium and nickel, is recycled to the synthesis gas generator the concentration of ash or incombustible residue tends to build up in the gas generator. It has been found, however, that the ash containing the heavy metals tends to accumulate in the water quench zone and, being heavier than the carbon, to settle to the bottom of the quench zone. A large part of the ash is easily removed from the quench zone wherein the gaseous products are cooled by direct contact with water and the ash is converted to a sand-like solid slag which settles to the bottom of the quench zone. The solid particles may be withdrawn through conventional lock hoppers not illustrated in the accompanying drawing.

An advantage of the process of this invention is that carbon produced in the generation of synthesis gas from liquid hydrocarbons is removed therefrom and utilized for the generation of carbon monoxide and hydrogen. Another advantage of the process of this invention is that the carbon formed in the manufacture of synthesis gas is efficiently disposed of without the necessity for complex or expensive apparatus and without accumulation and accompanying storage problems. Still another advantage of this process is that heat contained in the gaseous product of the synthesis gas generator is effectively utilized.

Having set forth the general nature of the invention, a preferred mode of the operation is illustrated in the accompanying drawings and described in the following detailed description and specific example. Although the drawing illustrates a suitable arrangement of apparatus by which the process of this invention may be practiced, it is not intended to limit the invention to the particular apparatus or procedure described in detail hereafter.

With reference to the drawing, water slurry containing carbon and oil, produced as described hereinafter, is passed from line 5 to tubular heater 6. Oil from line 7 is introduced by pump 8 into line 5, preferably just ahead of heater 6. In heater 6, water is vaporized to steam forming a dispersion comprising droplets of oil containing carbon suspended in steam. The resulting dispersion, preheated the desired extent, is discharged through line 9 at high velocity. Additional oil may be introduced to line 9 by pump 10. The resulting heated dispersion is introduced through burner 12 to a synthesis gas generator 13. Dispersion of fuel oil in steam is accomplished by passing water-oil-carbon mixture through tubular heater 6 wherein the water is vaporized to steam forming a stream of steam flowing at a velocity in excess of about 20 feet per second, preferably above 30 feet per second. Oil injected by pump 10 is dispersed by the high velocity stream in line 9. The velocity of the water-oil-carbon mixture supplied to heater 6 from line 5 is preferably maintained above about 0.5 foot per second, sufficient to develop a velocity above 20 feet per second in the steam section of the heater.

Oxygen from line 14 is supplied to burner 12 of the gas generator where it is admixed with the steam-oil-carbon dispersion supplied thereto from line 7. The steam, oil, carbon and oxygen react in gas generator 13 at an autogenous temperature above 2200° F., e.g., at a preferred temperature of about 2800° F. and at an elevated pressure, e.g., about 300 pounds per square inch gauge, to produce synthesis gas comprising carbon monoxide and hydrogen. Additionally, the synthesis gas contains entrained carbon in the range of 0.5 to 5 percent, preferably about 2 percent, of the carbon content of the oil feed to the gas generator. Cooling water is supplied to the burner through line 16 and discharged through line 17 to prevent overheating of the burner. Hot synthesis gas from gas generator 13 is discharged into quench chamber 18 into direct intimate contact with water contained therein. A preferred form of quench apparatus is described in U.S. Patent 2,896,927 to Nagle and Eastman. Water in the quench zone effects quick cooling of the hot gas from generator, removal of a large proportion of the entrained carbon from the freshly generated synthesis gas, and the production of steam useful in subsequent operations, for example the water gas shift reaction. The cooled synthesis gas is passed through line 19 to scrubber 21 where it is further contacted and scrubbed in countercurrent flow with water introduced through line 22. Synthesis gas, free from entrained carbon and enriched in water vapor, is withdrawn through line 23 and is discharged for further use not illustrated in the drawing.

The scrubber 21 is preferably provided with a section 24 containing packing, baffles, bubble plates or the like, to insure intimate countercurrent gas-liquid contact therein. A stream of water is recycled to section 24 of the gas scrubber by means of pump 26 and line 27. The wash liquid, i.e., water containing suspended carbon removed from the gas stream, accumulates in the accumulator section 28 of the gas scrubbing tower. Gas from line 19 supplied to the gas scrubber is introduced into the scrubber below the surface of the water in accumulator section 28 of the gas scrubber. A liquid level controller 29 maintains a substantially constant level of accumulated wash liquid in the accumulator section 28 of the gas scrubber by admitting water as required through control valve 30. Wash liquid from the gas scrubber is passed by pump 31 through line 32 to quench section 18 of the gas generator. The level of quench liquid, i.e., water containing carbon removed from the synthesis gas, is maintained substantially constant in quench section 18 of the synthesis gas generator by liquid level controller 33 which regulates flow through control valve 34. Carbon-in-water slurry is withdrawn from quench zone 18 by pump 35 to line 5. Fuel oil from line 7 is injected by pump 37 into the carbon-in-water slurry at the point of withdrawl of said slurry from quench zone 18. The amount of oil introduced at this point is limited to an amount within the range of one half to two times the oil absorption value of the carbon produced in the synthesis gas generator, preferably less than the oil absorption value of the carbon.

Advantageously, all of the remainder of the oil required as feed for the synthesis gas generator is added to the carbon-water slurry, by pump 8, immediately ahead of heater 6. As previously pointed out, part of the remainder of the oil required as feed may be added to the high velocity stream in line 9 by means of pump 10, or all of the additional oil may be added at this point. In this event, it may be desirable to further heat the mixture passing through line 9; means for accomplishing such further heating are not illustrated in the drawing.

In the particular embodiment illustrated, the rate of introduction of fresh water to gas scrubber 21 is controlled by valve 41 at a constant rate. Slurry is withdrawn from quench chamber 18 at a constant rate as determined by positive displacement pump 35 exceeding the rate at which water supplied through line 22 accumulates in section 28 of the scrubber.

A density meter 42, indicates the carbon content of the slurry withdrawn from quench chamber 18. The density meter, per se, which forms no part of the subject invention indicates to the operator any abnormally high concentration of carbon in the quench water, which may be corrected by withdrawl of quenh water from the bottom of the quench vessel through valve 44.

Accumulations of heavy, incombustible solid in quench chamber 18 may be periodically withdrawn through valve 44. Preferably, a lock hopper, not illustrated in the drawing, is employed to effect the removal of incombustible solid from the gas quench zone.

The following specific example illustrates the process of this invention.

A synthesis gas generator is operated to produce carbon monoxide and hydrogen while charging Duri crude oil of 23.4 API gravity having a gross heating value of 19,126 B.t.u.'s per pound. The oil has the following ultimate anaysis:

| Component: | Weight percent |
|---|---|
| Carbon | 87.09 |
| Hydrogen | 12.41 |
| Sulfur | 0.17 |
| Nitrogen | 0.28 |
| Oxygen | 0.04 |
| Ash | 0.01 |

This oil contains approximately 27 parts per million nickel (expressed as the elemental metal) and vanadium, about 1 part per million.

Quench water containing carbon and fuel oil, obtained as described later, is pumped to a tubular heater at the rate of 3936.5 pounds per hour. This quench water mixture comprises 3,767 pounds of water, 56.5 pounds of carbon, and 113 pounds fuel oil. Water is vaporized from the mixture in the tubular heater forming a dispersion of the carbon and fuel oil in resulting steam generated in the preheater. The remaining fuel oil required for the process is injected at the rate of 6,382 pounds per hour into the steam containing the carbon and oil dispersion from the preheater and the mixture preheated to 750° F. in a tubular preheater in highly turbulent flow to form a dispersion of oil droplets in the steam. The resulting dispersion of oil and carbon in steam is introduced into a synthesis gas generator through a mixer-burner where the dispersion is mixed with oxygen of 95% purity supplied to the burner at the rate of 7260 pounds per hour (basis 100% oxygen). The oxygen is preheated to 300° F. The synthesis gas generator is a compact, unpacked reaction zone maintained at 400 pounds per square inch gauge and an autogenously generated temperature of 2400° F. to produce 9,908,000 standard cubic feet per day (60° F. and atmospheric pressure) of wet synthesis gas having the following analysis:

| Component: | Weight percent |
|---|---|
| Carbon monoxide | 38.10 |
| Hydrogen | 42.64 |
| Carbon dioxide | 4.98 |
| Water | 12.87 |
| Methane | 0.22 |
| Argon | 0.76 |
| Nitrogen | 0.39 |
| Hydrogen sulfide | 0.04 |

The hot product gas issuing from the generator is quench cooled and scrubbed with water to remove substantially all of the carbon from the gas stream. The resulting slurry of carbon in water is withdrawn from the quench section of the synthesis gas generator at the rate of 3823.5 pounds per hour. This slurry comprises 56.5 pounds per hour of carbon (a carbon concentration of 1.48 weight percent). To this carbon-water slurry is added 113 pounds per hour of the heavy fuel oil feed (two pounds per pound of carbon). The heavy fuel oil is mixed with the carbon-water slurry to form a free flowing mixture which is homogeneous in appearance and which is readily pumpable. The resulting mixture is passed directly to a tubular heater wherein the water is vaporized to form a dispersion of carbon and steam as described above. This method of operation results in complete consumption of the fuel oil with no net carbon production. It will be evident from this example, that one percent of the carbon contained in the charge oil is liberated as carbon in the gas generator. This liberated carbon adsorbs or sequesters the vanadium and nickel contained in the fuel oil and provides protection to the refractory lining of the synthesis gas generator against attack by the heavy metal compounds contained in the fuel oil. The vanadium and nickel eventually accumulate as solid granular material in the water quench section of the gas generator which is periodically removed.

It will be evident that the process of this invention permits operation of the synthesis gas generator with the liberation of sufficient carbon to protect the lining of the gas generator and at the same time permits total recycle of the carbon with all of the quench water withdrawn from the gas-water contact section of the gas generation system.

I claim:
1. In a method for generation of synthesis gas by partial oxidation of hydrocarbons which comprises reacting liquid hydrocarbon with oxygen and steam in an unpacked reaction zone at an autogenously maintained temperature in the range of about 1800 to 3500° F. with the production of a minor amount of free carbon in the range of 0.5 to 5 percent of the total carbon contained in the reactants supplied to the reaction zone producing a hot gas stream comprising carbon monoxide, hydrogen and entrained carbon, and contacting said hot gas stream from said reaction zone with water in a gas-liquid contacting zone effecting removal of carbon from said gas stream and forming a slurry of carbon in water, the improvement which comprises returning all of the carbon to the reaction zone by withdrawing from said gas-liquid contacting zone a slurry of carbon in water containing from about one to about four weight percent carbon, introducing liquid hydrocarbon oil directly into said slurry in an amount within the range of 0.5 to 2 times the oil absorption value of the carbon and mixing said oil with said slurry forming a free flowing mixture; passing said entire mixture into an externally heated tubular heating zone under conditions of turbulent flow wherein water contained in said mixture is completely vaporized and the oil and carbon contained in said mixture are suspended in dispersed particle form in resulting steam; and passing the resulting dispersion comprising carbon and oil droplets suspended in steam directly into said reaction zone as reactants for the generation of synthesis gas.

2. A process according to claim 1 wherein said heavy fuel oil is heated to a temperature approximately equal to the temperature of said slurry of carbon in water prior to contact therewith.

3. In a process for the production of carbon monoxide and hydrogen by partial oxidation of heavy fuel oil wherein said oil is reacted with oxygen and steam in a reaction zone to produce a gas stream comprising carbon monoxide, hydrogen and entrained solid carbon, the improvement which comprises contacting said product gas stream with water in a gas-liquid contacting zone effecting removal of carbon from said gas stream and forming a slurry of carbon in water containing from about one to about four percent carbon by weight; withdrawing said slurry from said gas-liquid contact zone; immediately intimately mixing said withdrawn slurry with heavy fuel oil feed for said process in an amount within the range of 0.5 to 2 times the oil absorption value of the carbon contained therein; passing the entire resulting mixture of oil and water containing said carbon to a tubular heating zone; adding additional heavy fuel oil to said mixture immediately prior to its introduction to said heating zone; completely vaporizing said water to steam in said heating zone under conditions of turbulent flow forming a dispersion comprising oil droplets and carbon in steam; and passing the resulting dispersion directly into said gas generation zone in admixture with oxygen for the production of carbon monoxide and hydrogen therefrom.

References Cited by the Examiner
UNITED STATES PATENTS

| | | | |
|---|---|---|---|
| 2,716,053 | 8/1955 | Mayland | 48—196 |
| 2,867,508 | 1/1959 | Wood et al. | 23—209.4 |
| 2,980,521 | 4/1961 | Dille et al. | 48—196 |
| 2,980,523 | 4/1961 | Dille et al. | 48—215 |
| 3,016,986 | 1/1962 | Dille et al. | 48—196 |
| 3,097,082 | 7/1963 | Guptill | 48—215 |

MORRIS O. WOLK, *Primary Examiner.*

MAURICE A. BRINDISI, *Examiner*